United States Patent [19]

Seidel et al.

[11] 4,081,878

[45] Apr. 4, 1978

[54] TAPE CLEANING DEVICE

[75] Inventors: William H. Seidel; Ralph B. McDaniel, both of Canoga Park, Calif.

[73] Assignee: N.O.V.A. Corporation, Canoga Park, Calif.

[21] Appl. No.: 631,504

[22] Filed: Nov. 13, 1975

[51] Int. Cl.² .......................... B08B 1/02; G11B 3/58
[52] U.S. Cl. ................................. 15/256.5; 15/93 R; 15/236 A; 360/137
[58] Field of Search ............... 15/93 R, 236 NO, 308, 15/256.5; 274/47; 360/137; 355/15; 352/130

[56] References Cited

U.S. PATENT DOCUMENTS

| | | |
|---|---|---|
| 3,370,982 | 2/1968 | Hayunga ............................ 15/93 R |
| 3,587,128 | 6/1971 | Gualtieri ............................ 15/93 R |
| 3,616,478 | 11/1971 | Martz et al. ....................... 15/93 R |
| 3,683,445 | 8/1972 | Hagadorn .......................... 15/308 |
| 3,702,906 | 11/1972 | Camras ............................. 274/47 X |
| 3,757,374 | 9/1973 | Baskin et al. ...................... 15/93 R |

*Primary Examiner*—Daniel Blum
*Attorney, Agent, or Firm*—Jack C. Munro

[57] ABSTRACT

A magnetic tape cleaning device comprising a monocrystalline block fixedly positioned by a mounting means upon a base, the base being fixedly secured in a desired position upon the recorder housing in the path of the magnetic tape, the grain pattern of the monocrystalline block being determined prior to installation of the block so that the direction of the grain pattern being located at substantially a right angle to the magnetic tape.

11 Claims, 14 Drawing Figures

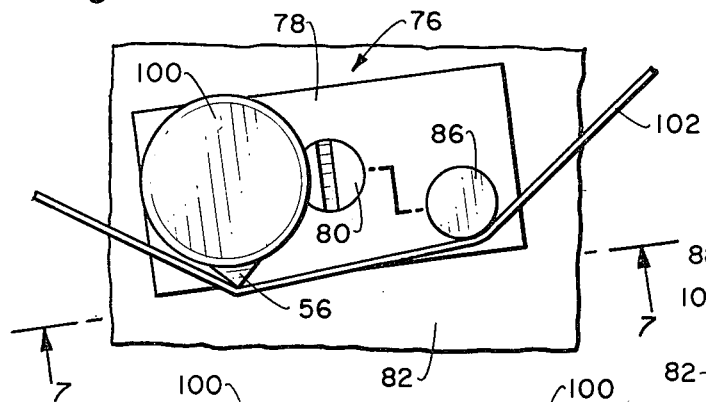
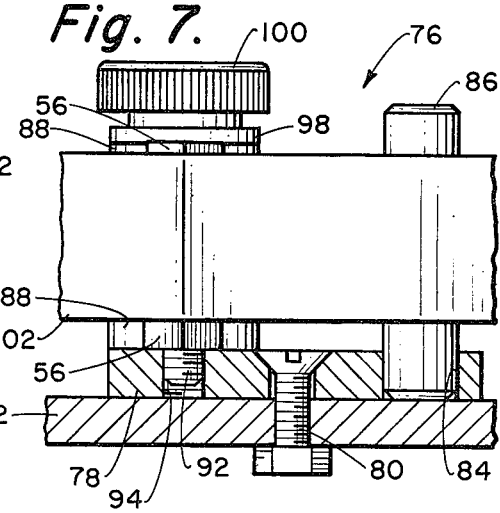
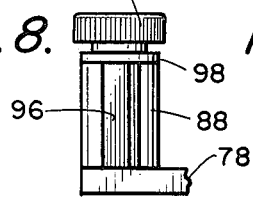
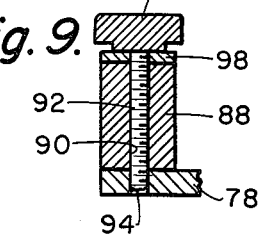
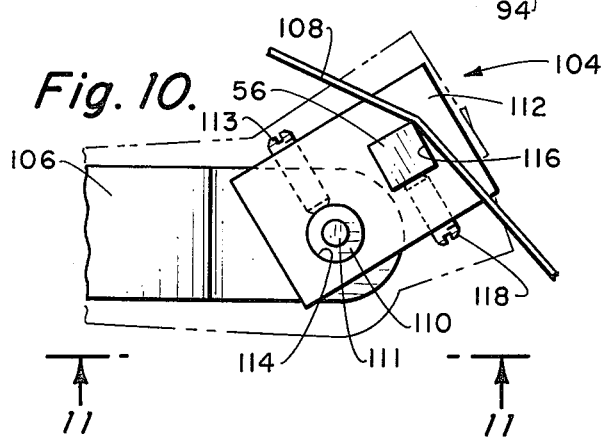
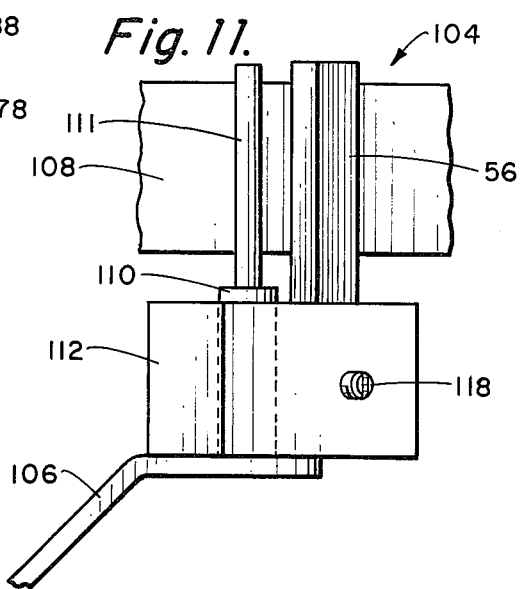
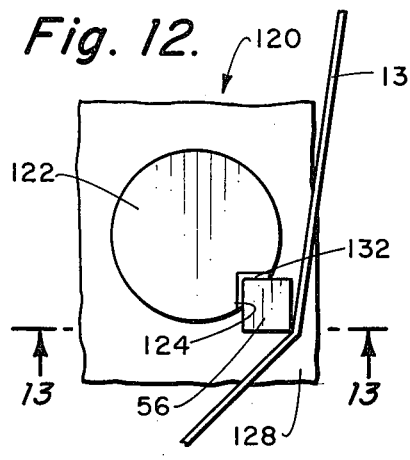
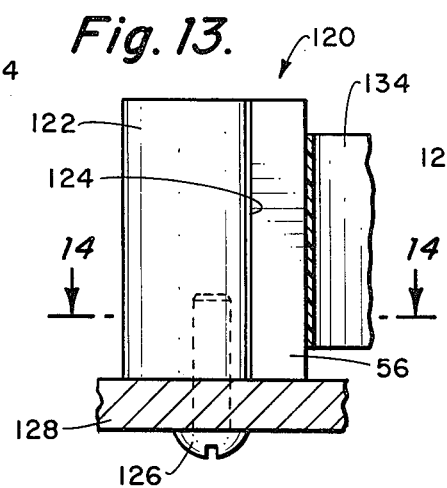
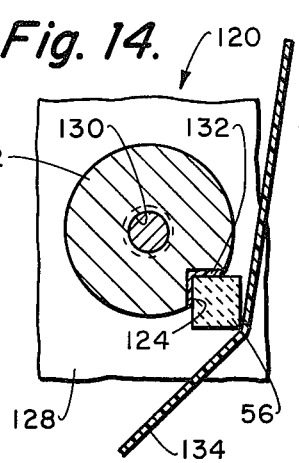

TAPE CLEANING DEVICE

BACKGROUND OF THE INVENTION

This invention relates to an apparatus for cleaning magnetic recording tape and more particularly to an apparatus which is designed to be employed in conjunction with a video tape recorder to remove foreign particles from the face of the tape.

A clean video magnetic tape is desirable in order to obtain good picture quality and to reduce the wear of the playback and recording head of the video tape machine. Under normal use, the magnetic tape will become contaminated with debris such as dust, dirt, body salts, food particles, cigarette ashes, old oxide, backing materials, etc. These build-up of unwanted materials cause "drop-outs". These drop-outs either result in a poor picture quality or no picture at all in the area of the drop-outs.

It has been common in the past to employ a machine separate from the recording machine to clean the magnetic tape. On a regular basis, the video tape is removed from the recording machine and placed upon the separate cleaning machine and the tape is cleaned. Naturally, there is a substantial additional expense required in order to have available the cleaning machine. If one does not have a cleaning machine, the video tape can be transported to a service organization whose sole purpose is to clean magnetic tape. This also requires a substantial periodic expense.

Previously, such cleaning machines have frequently employed the use of metallic cleaning devices such as a metal scraper which frequently is in the form of a conventional razor blade. These type of cleaning metal blades are not satisfactory since the blade itself leaves deposits of metal particles on the tape. These metal particles produce problems during read-out and also are subject to a chemical reaction with the coating material of the tape. The breakdown of the metal is enhanced by the high heat factor generated due to the friction between the moving tape and the metal cleaning blade. The breakdown of the metal is particularly prevalent with steel, which is softer than many of the oxide coatings of the magnetic tape. These blades, as they are worn, produce uneven edges which is capable of producing scratches and grooves within a magnetic tape. Further, the metal blades are not capable of being polished to a keen edge and will not take steep clearance angles. As a result, it is impossible to get a good cutting edge with the use of a metal blade.

Previously, it has been known to employ the use of a monocrystalline material to perform the removal of the contaminants from a magnetic tape. Previously, there has been no consideration given as to the granular pattern formed within the monocrystalline block. By being made aware of the grain pattern within the block, certain sharpened edges of the block have the capability of lasting for a longer period of time by reason of being oriented in a particular manner in view of the grain pattern.

Further, there has been no known tape cleaning block which is designed to be placed directly upon an existing machine designed for the recording and playback of magnetic tapes, thereby completely eliminating the separate machine that has been necessary in the past in order to effect cleaning of magnetic tape.

SUMMARY OF THE INVENTION

This invention relates to a tape cleaning device which employs a monocrystalline tape cleaning block, such as a sapphire or ruby. This type of tape cleaning block is extremely hard and an extremely sharp cutting edge can be formed thereon. This sharpened cutting edge can be formed keenly and evenly which will last for a relatively long period of time. Such monocrystalline type of blocks are particularly advantageous since it will not react with the oxide upon the tape. While natural ruby and sapphire (commonly called corundum) are satisfactory, such as considerably more expensive than the synthetic versions of the material which therefore are preferable. Ruby and sapphire materials, whether natural or synthetic, have been found to be particularly suitable since they are single crystals (monocrystalline) which are chemically inert. This property permits the magnetic tape to be processed uniformly across its width, since the blade will have the same characteristics throughout. Because the block is chemically inert, there will not be any reaction with the oxide coating of the tape. These monocrystalline materials are harder than the typical oxide coatings, such as iron oxide of the magnetic tape and can take a cutting edge and hold it for a longer period of time. On the conventional Mohs Scale of Hardness these materials have a rating of nine. Other monocrystalline materials not suitable for use in the subject invention are quartz (Mohs Scale rating of seven) as such is too soft as is glass. Using glass, for example, while an edge can be placed on it, the edge will not last. This also holds true for quartz. It has been found that when using a sapphire block as a magnetic tape cleaning device, one such blade on a block can process more than fifty 1800 foot reels of tape while still maintaining a sharp uniform cutting edge.

The subject matter of this invention relates to the forming of a plurality (actually four in number) of cutting edges upon a single tape cleaning block. This block is to be mounted within a mounting device wherein the block can be removed and repositioned so that another cutting edge of the block can be employed. In order to accomplish this, the block is formed to be of a square shape in cross-section. Also, within this invention, the granular pattern within the tape cleaning block is determined and therefore certain edges of the tape cleaning block are known to be more longer lasting than the other edges of the block. This means that the expectant life of each cutting edge can be accurately predicted.

The tape cleaning block of this invention is capable of being employed with different types of mounting means depending upon the type of recorder housing upon which the block is to be placed. Each mounting means included within this invention provides for the easy removal and replacement of the tape cleaning block in a different position in order to take advantage of a different cutting edge of the block and different angle of attack. Because the tape cleaning block of this invention has four different cutting edges, the life of the block can be greatly enhanced.

BRIEF DESCRIPTION OF THE DRAWINGS

FIG. 6 is a plan view of a second embodiment of mounting device to be employed in conjunction with the tape cleaning block of this invention;

FIG. 7 is a cross-sectional view taken along line 7—7 of FIG. 6;

FIG. 8 is a view of the mounting post for the tape cleaning block of the second embodiment with the tape cleaning block having been removed therefrom;

FIG. 9 is a cross-sectional view of the mounting post of FIG. 8;

FIG. 10 is a plan view of a third embodiment of a mounting device for the tape cleaning block of this invention;

FIG. 11 is an end view of the third embodiment of this invention taken along line 11—11 of FIG. 10;

FIG. 12 is a plan view of a fourth embodiment of a mounting device for the tape cleaning block of this invention;

FIG. 13 is a view taken along line 13—13 of FIG. 12; and

FIG. 14 is a cross-sectional view taken along line 14—14 of FIG. 13.

DETAILED DESCRIPTION OF THE SHOWN EMBODIMENTS

Figure 1:
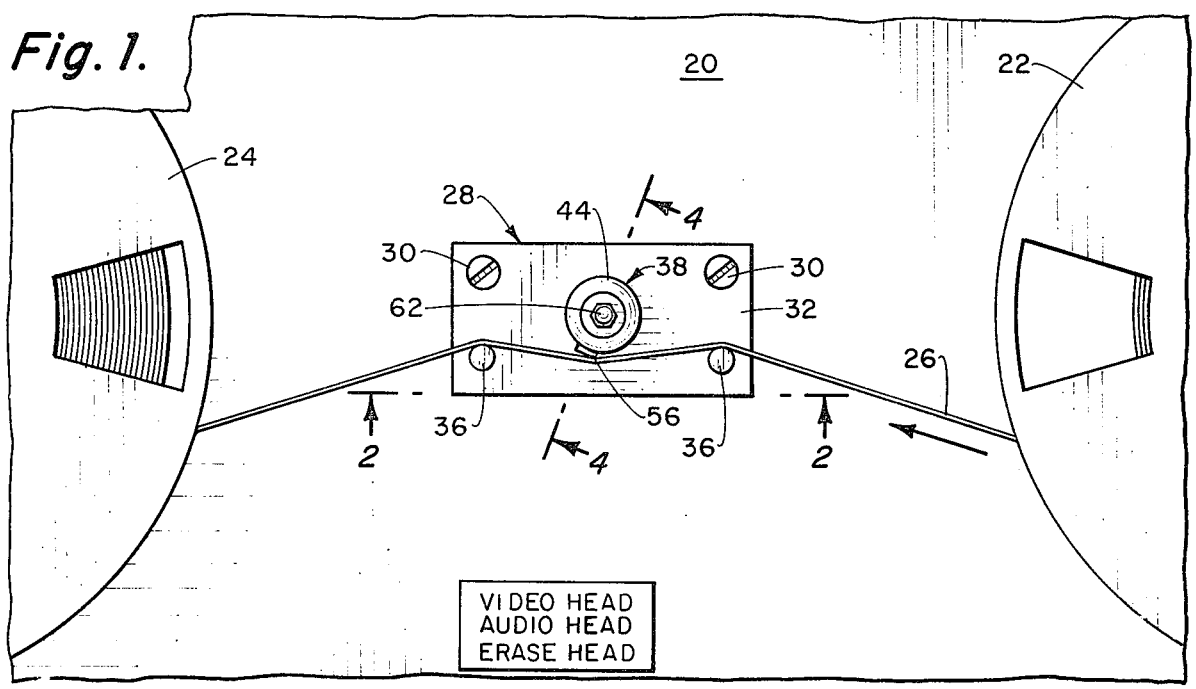
FIG. 1 is a plan view of a recorder housing upon which has been mounted the tape cleaning device of this invention.
Figure 2:
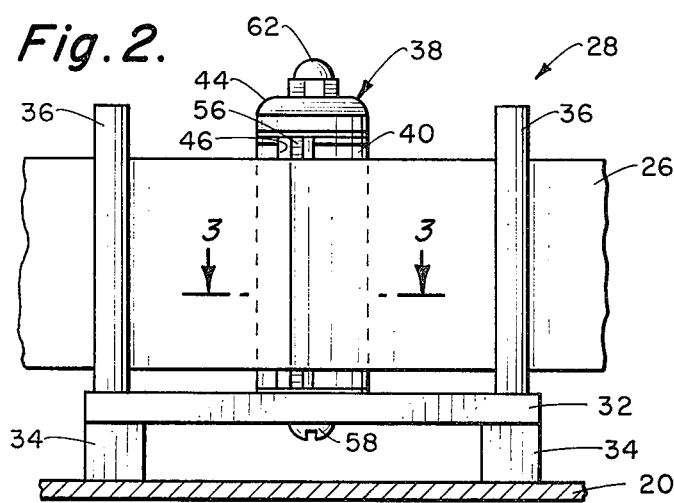
FIG. 2 is a front view of the tape cleaning device of this invention taken along line 2—2 of FIG. 1.

Referring in particular to the drawings, there is shown in FIG. 1 a tape recorder housing 20 having rotatably mounted thereon a magnetic tape supply reel 22 and a magnetic tape take-up reel 24. The magnetic tape 26 is unwound from the supply reel 22 and is to be wound upon the take-up reel 24. The construction of the recorder housing 20 is deemed to be conventional and need not be described herein in detail. In order to understand the application of the structure of this invention, it is only necessary to be aware that such recorders do have housings 20 and a supply reel 22 and a take-up reel 24.

The first embodiment of device 28 of this invention is adapted to be fixedly mounted by screws 30 on the housing 20 and between the reels 22 and 24. With the first embodiment, device 28 of this invention, it is designed to be employed during the rewind mode of the recorder. After the video tape has been either recorded or played back and has come to the end of the reel, during the rewind position, the tape is removed from the recording head or play-back head (neither being shown) and placed in conjunction with the device 28 of this invention. It is during this rewinding of the tape, that the device 28 performs its operation of cleaning of the magnetic tape 26.

The device 28 of this invention is designed to be employed with the wide video tape, such as a two inch type of tape. As will become apparent further on in the specification, other types of devices of this invention which are to be employed with narrower tape may be employed during the recording and playing back operation and not during the rewind operation.

The device 28 of this invention is composed of a base 32 through which the screws 30 pass and function to mount the device 28 to the recorder housing 20. Connected to the underside of the base 32 are mounting feet 34 which take the form of elongated bars. There are only two such mounting feet 34, however, a greater number may be employed if desired.

Attached on the upper surface of the base 32 are a pair of guide pins 36. Each guide pin 36 is cylindrical in configuration and both guide pins 36 are to cooperate to conduct the magnetic tape 26 in a particular location in a particular manner across the device 28.

Also fixedly mounted upon the base 32 is an upright post assembly 38. The post assembly 38 includes a main member 40 which has a center elongated opening 42. Within the periphery of the main member 40 is an elongated recess 46. The outer diameter of the cap 44 is identical to the diameter of the main member 40. Within the cap 44 is located an opening 48 and with the cap 44 placed upon the main member 40, the opening 48 aligns with opening 42.

Located between the main member 40 and the base 32 is a strip of frictional material 50 such as emery cloth. A similar strip 52 of such material is located on the under surface of the cap 44. The material 52 is in contact with a disc 54 of compressible material, such as cork. The compressible material 54 does not extend across the recess 46. However, the emery cloth 52 does extend across the recess 46 and cover the entire under surface of the cap 44.

Located within the recess 46 is a tape cleaning block 56. Block 56 will normally be constructed of a monocrystalline material, such as sapphire. The block 56 is shown to be of a certain elongated length and it can be seen that the block 56 is in contact with both emery cloth 50 and emery cloth 52. A threaded bolt 58 extends through an opening 60 formed within the base 32 and through the aligned openings 42 and 48. The bolt 58 has placed on its free end thereof a nut 62. The head of the bolt 58 is in contact with the under surface of the base 32.

Figure 4:
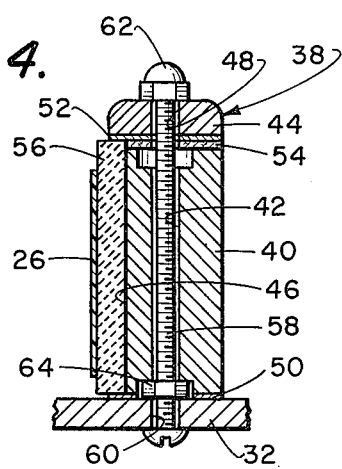
FIG. 4 is a cross-sectional view of the upright post which is used to mount the tape cleaning block taken along line 4—4 of FIG. 1.

Upon tightening of the nut 62, the crystal 56 is clamped between the cap 44 and the base 32, as shown in FIG. 4 of the drawings. Slight movement of the cap 44 with respect to the main section 40 in order to effect this clamping action is permitted due to the placement of the compressible material 54 between the cap 44 and the main section 40. A nut 64 is included to independently tightly secure the bolt 58 to the base 32.

Figure 5:
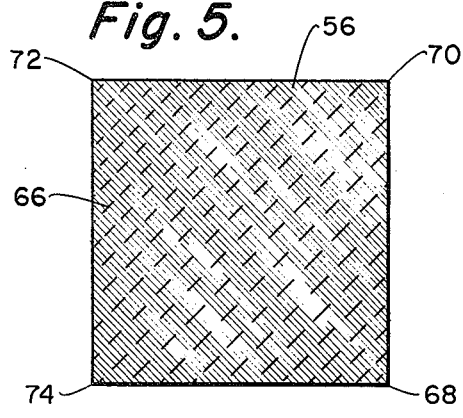
FIG. 5 is a cross-sectional view showing a granular pattern within the tape cleaning block of this invention.

As shown in FIG. 5 of the drawings, the crystal 56 includes a series of dash lines 66 which represents the granular pattern of the crystal 56. The crystal 56 is formed into a square configuration wherein each side is of equal width. This means that the crystal 56 has corners 68, 70, 72 and 74. It is to be noted that if the magnetic tape 26 was passing by either corner 70 or 74, the granular pattern represented by line 66 would be almost perpendicular to the surface of the tape 26. It is to be further noted that if the tape was to be passing by the corner 68 or 72, that the granular pattern would almost be parallel to the surface of the tape 26. It has been found that if the granular pattern is perpendicular to the surface of the tape, as would be the case for corners 70 and 74, that the life of the sharpened edge of the corners 70 and 74 is much greater and that these corners will actually last a lot longer during use than corners 68 and 72.

Therefore, in actual practice, it is the normal procedure that the block 56 will be installed within the mounting post assembly 38 so that at corner 70 would be initially exposed to the magnetic tape 26. After an extended life period for corner 70, the threaded bolt 58 can be loosened and the block 56 removed turned upside down and rotated one hundred and eighty degrees thereby causing corner 74 to become exposed to the magnetic tape 26. The nut 62 is then tightened upon the bolt 58 thereby reclamping of the block 56 between the base 32 and the cap 44.

Also, the corners 68 and 72 may be employed to effect cleaning of the tape upon the corners 70 and 74 becoming dull. It is just to be understood that the corners 68 and 72 will not last as long as the corners 70 and 74.

The following description will relate to different mounting devices that can be employed in conjunction with the block 56 of this invention. The type of block 56 that is to be employed will be the same throughout the entire description of this invention. It only being that different mounting devices are to be employed in conjunction with the block 56.

Figure 3:
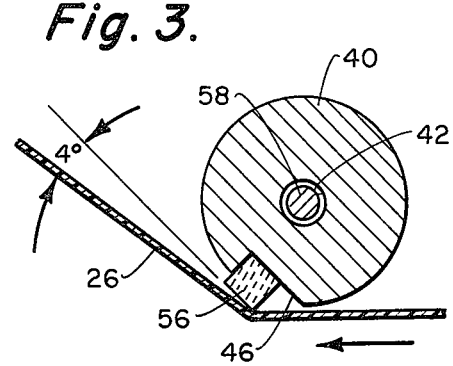
FIG. 3 is a cross-sectional view taken along line 3—3 of FIG. 2.

Referring in particular to FIGS. 6 through 9, the second embodiment 76 of mounting device of this invention is shown. The second embodiment 76 includes a base 78 which is fixedly mounted by screw 80 to the recorder housing 82. An enlarged opening 84 is provided within the base 78 into which is press fitted a guidepost 86. A mounting post 88 has an elongated opening 90 therethrough. A threaded rod 92 fits in through the opening 90 and connects with a threaded opening 94 located within the base 78. The mounting post 88 includes an elongated recess 96 within which is to be located the sapphire block 56. A washer 98 is provided at the top of the mounting post 88. An enlarged cap 100 is attached to the threaded rod 92 with the underside of the cap 100 being in contact with the washer 98. In a manner similar to what was previously described in relation to the first embodiment of this invention, the length of the block 56 is slightly greater than the height of the post 88. When the block 56 is located within the recess 96 and the cap 100 is tightened, the washer 98 is forced against the upper surface of the block 56 thereby exerting a clamping action upon the block 56 between the washer 98 and the base 78. The magnetic tape 102 is to be conducted around the guidepost 86 and in contact with the exposed sharpened edge of the block 56 which has been positioned at the preferred angle with respect to the path of the magnetic tape 102. It is to be noted that the preferred angle is four degrees as is shown in FIG. 3 of the drawings. For purposes of illustration, the angle has been exaggerated on the drawings.

Referring in particular to FIGS. 10 and 11 of the drawings, a third embodiment 104 of mounting device is shown. The mounting device 104 is adapted to be mounted upon an arm 106 which is part of the recording device. The embodiment 104 is not mounted directly upon the recorder housing as the previous two embodiments. The arm 106 includes a guidepost 110. The arm 106 is spring biased into the path of the magnetic tape 108.

The mounting device 104 includes a base 112 which includes an opening 114 through which the guidepost 110 passes. The guidepost includes a smaller diametered section 111 which extends above base 112. A set screw 113 extends through base 112 to secure guidepost 110 in position. The preferred angular position of the mounting device 104 upon the arm 106 is predetermined prior to tightening of the screw 113. The base 112 also includes a square shaped opening 116 into which is to be located the block 56. A set screw 118 is threadably secured within the base 112 and connects with the block 56. The function of the set screw 118 is to fixedly secure the block 56 with respect to the base 112.

It is to be noted that block 56 can be removed from the base 112 and repositioned so as to place a different sharpened edge within contact with the tape 108.

Referring in particularly to FIGS. 12, 13 and 14, a fourth embodiment of mounting device 120 is shown. The fourth embodiment 120 includes a mounting post 122 within which is located an elongated recess 124. The mounting post 122 is to be secured by a bolt 126 to a plate 128 which could be either the recording housing or some portion of the recorder, such as a movable arm as was previously mentioned in relation to the third embodiment of this invention. The bolt 126 cooperates within a threaded opening 130 located within the mounting post 122. A quantity of adhesive 132 is to be placed within the recess 124 and the block 56 is to be placed within the recess 124 and adhesive to securely bind the block 56 to the mounting post 122. The outermost corner of the block 56 is exposed and adapted to be in contact with the magnetic tape 134.

When it is desired to remove the block 56 in order to reposition the block and to expose another sharpened edge of the block to the tape 134, a solvent is placed upon the adhesive 132 to dissolve the adhesive and then the block 56 is removed and repositioned and then readhesively secured to the mounting post 122.

By incorporating the device of this invention in conjunction with a tape recorder, the life of the video tape is substantially increased. Even after all four edges of the sapphire crystal become dull, the crystal may be rejuvinated and then reused. The devices of this invention can be readily installed by one unskilled in the structure of tape recorders. The device of this invention is most inexpensive compared conventional tape cleaning devices. No auxiliary cleaning equipment is needed because the device of this invention is installed directly upon the tape recorder. The tape recorder can still operate normally in all modes as the operation of this device is completely separate from the operation of the recorder.

In normal practice, after a complete pass of the video tape upon the crystal block, the sharpened edge of the crystal block that is in contact with the tape is then cleaned by a cloth containing a solvent that readily dissolves and removes dirt, oil and any other type of contaminant. However, it is not necessary to clean after each pass of the tape as it may be only necessary to clean the crystal block after every half dozen passes of the tape.

What is claimed is:

1. In combination with a video tape recorder having a recorder housing upon which is mounted a recording head, a playback head, a supply reel and a take-up reel for magnetic tape, a tape cleaning device mounted on said recorder housing in the path of said magnetic tape, said device comprising:

a tape cleaning block constructed of a material of extreme hardness, said block having at least one angularly formed elongated sharp edge, said sharp edge to contact said magnetic tape to effect cleaning thereof, said block having an internal granular pattern extending in a given direction, said direction of said granular pattern being located at substantially a right angle to said magnetic tape;

mounting means for fixedly mounting said block upon said housing, said mounting means including structure enabling said block to be removed for subsequent remounting of said block in a different position within said mounting means.

2. The combination as defined in claim 1 wherein: said mounting means including fastening means, said mounting means comprising an upright post attached by said fastening means to said housing, said upright post being selectably movable to assume different positions upon said housing and upon tightening of said fastening means said upright post being thereby fixed in position.

3. The combination as defined in claim 2 wherein: said upright post having an elongated recess, said tape cleaning block being located within said recess, securing means to fix said block within said recess.

4. The combination as defined in claim 3 wherein: said securing means comprising an adhesive located between said block and said upright post when positioned within said recess.

5. In combination with a video tape recorder having a recorder housing upon which is mounted a recording head, a playback head, a supply reel and a take-up reel for magnetic tape, a tape cleaning device mounted on said recorder housing in the path of said magnetic tape, said device comprising:
a tape cleaning block constructed of a material of extreme hardness, said block having at least one angularly formed elongated sharp edge, said sharp edge to contact said magnetic tape to effect cleaning thereof, said block having an internal granular pattern extending in a given direction, said direction of said granular pattern being located at substantially a right angle to said magnetic tape;
mounting means for fixedly mounting said block upon said housing, said mounting means including structure enabling said block to be removed for subsequent remounting of said block in a different position within said mounting means;
said mounting means including fastening means, said mounting means comprising an upright post attached by said fastening means to said housing, said upright post being selectably movable to assume different positions upon said housing and upon tightening of said fastening means said upright post being thereby fixed in position;
said upright post having an elongated recess, said tape cleaning block being located within said recess, securing means to fix said block within said recess;
said securing means comprising a threaded member attached to a cap, said upright post being mounted upon a base, said threaded member extending through said upright post and being threadably secured to said base, upon tightening of said cap said block is frictionally held between said base and said cap.

6. The combination as defined in claim 5 including:
a thin disc of compressible material located between said cap and said upright post whereby as said cap is tightened said compressible material compresses to facilitate a tight frictional engagement between said block and cap and said base.

7. The combination as defined in claim 6 including:
an abrasive surface located between said cap and said upright post and also between said base and said upright post, whereby said abrasive surface is to be in direct contact with both ends of said block to thereby facilitate retaining of said block in its fixed position.

8. The combination as defined in claim 5 wherein:
said block having a polygonal configuration whereby said block includes a plurality of angularly formed elongated sharpened edges.

9. A magnetic tape cleaning device to be used in conjunction with a tape recorder comprising:
a base;
a tape cleaning block being formed of a monocrystaline substance;
an upright post mounted upon said base, said upright post having an elongated vertical recess therein, means to fix secure said block within said recess, said block being polygonal in configuration and having a plurality of angularly formed elongated sharp edges, said means permitting removal of said block and repositioning of said block so as to expose a different sharpened edge; and
said securing means comprising a threaded member attached to a cap, said threaded member extending through said upright post and being threadably secured to said base, upon tightening of said cap said block is frictionally held between said base and said cap.

10. The device as define in claim 9 wherein:
guide post means mounted upon said base, said guide post means comprising at least one guide post being fixedly secured to said base and spaced from said upright post, said guide post means being adapted to be in contact with the magnetic tape and to function to correctly position at the preferred angle the magnetic tape as it comes into contact with said block.

11. The device as defined in claim 10 wherein:
said guide post means comprising a first guide post and a second guide post, said first guide post located on one side of said upright post with said second guide post located on the opposite side of said upright post.

* * * * *